United States Patent
Barker et al.

(10) Patent No.: US 8,370,248 B2
(45) Date of Patent: Feb. 5, 2013

(54) TBA FUTURES CONTRACTS AND CENTRAL COUNTERPARTY CLEARING OF TBA

(75) Inventors: Peter Barker, Chicago, IL (US); Morgan Culverhouse, Chicago, IL (US); Larry Grannan, Chicago, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 838 days.

(21) Appl. No.: 11/865,176

(22) Filed: Oct. 1, 2007

(65) Prior Publication Data

US 2009/0089197 A1 Apr. 2, 2009

(51) Int. Cl.
G06Q 40/00 (2012.01)
(52) U.S. Cl. ............................................. 705/37; 705/35
(58) Field of Classification Search .................... 705/37, 705/36 R, 35
See application file for complete search history.

(56) References Cited

U.S. PATENT DOCUMENTS

| | | | | |
|---|---|---|---|---|
| 5,497,317 | A * | 3/1996 | Hawkins et al. ............... 705/37 |
| 6,317,727 | B1 * | 11/2001 | May ............................. 705/36 R |
| 6,622,129 | B1 | 9/2003 | Whitworth |
| 7,337,136 | B1 * | 2/2008 | Burns et al. .................. 705/36 R |
| 7,870,060 | B2 * | 1/2011 | Barker et al. .................. 705/37 |
| 2003/0018558 | A1 * | 1/2003 | Heffner et al. ................. 705/37 |
| 2003/0236737 | A1 * | 12/2003 | Kemp et al. .................... 705/37 |
| 2005/0097025 | A1 | 5/2005 | Horton |
| 2006/0106708 | A1 | 5/2006 | Abushaban |
| 2007/0136180 | A1 * | 6/2007 | Salomon et al. ............... 705/37 |
| 2008/0114702 | A1 * | 5/2008 | Hawrysz ..................... 705/36 R |
| 2008/0183613 | A1 * | 7/2008 | Frankel .......................... 705/37 |

OTHER PUBLICATIONS

Abken, P. A. (1994). Over-the-counter financial derivatives: Risky business? Economic Review—Federal Reserve Bank of Atlanta, 79(2), 1-1. Retrieved Sep. 27, 2012.*

Written Opinion and International Search Report for PCT/US08/76531 dated Nov. 2008.

A Central Counterparty for Martgage-Backed Securities: Paving the Way, dated Apr. 11, 2006, downloaded from http://www.dtcc.com/downloads/legal/imp_notices/2006/ficc/gov/GOV050.06.html on Dec. 28, 2007.

International Preliminary Report on Patentability and Written Opinion of PCT/US08/76531 mailed Apr. 15, 2010.

* cited by examiner

Primary Examiner — Kito R Robinson
(74) Attorney, Agent, or Firm — Banner & Witcoff, Ltd.

(57) ABSTRACT

Networks, systems and methods that match orders for TBA futures and settle and clear open positions for TBA futures are disclosed. The TBA futures may include MBS TBA future contracts. A central counterparty clearing firm may net long and short positions and generate delivery instructions to parties having open positions.

14 Claims, 4 Drawing Sheets

TBA FUTURES CONTRACTS AND CENTRAL COUNTERPARTY CLEARING OF TBA

BACKGROUND

1. Field of the Invention

The present invention relates to systems and methods for managing trading of investment vehicles, and particularly, to-be-announced (TBA) instruments.

2. Description of the Related Art

Mortgage backed securities (MBS) are bought and sold through different market mechanisms. Some mechanisms include a pass-through MBS issued by or guaranteed by institutions such as Fannie Mae, Freddie Mac and Ginnie Mae. A pass-through security may be created when multiple mortgages are pooled together and sold as undivided interests. The mortgages generally have similar characteristics, such as loan type, maturity and interest rate. An originator, such as a lender, services the mortgage and passes the principal and interest through, less a servicing fee, to a MBS issuer. The mortgages may be packaged by the issuer and sold to investors. The principal and interest, less guaranty and other fees are thus passed through to the investor. The investor receives a share of the resulting cash flows.

The pass-through securities, or MBS, may trade on a to-be-announced (TBA) market. A TBA contract is an underlying contract to buy or sell a MBS that is delivered at a predetermined future date. Under the TBA contract, the seller promises to deliver MBS on the future settlement date and a purchaser agrees to acquire a specified dollar amount of MBS. The contract is satisfied when the seller delivers the MBS pools at settlement. Thus, a mortgage lender may use a TBA contract to lock in an interest rate on loans it will fund before the loan is closed.

In a TBA market, MBS are traded on a forward or delayed delivery basis with settlement up to 180 days later. The actual mortgage pools comprising the MBS are not specified at the time of sale. In fact, many of the mortgage loans may not even be signed (and the mortgage pools created) at the time of sale. The largest volume of trading in the TBA market is for settlement within 30 days.

The parties to a TBA trade may agree to the type of security, coupon, face value, price, and settlement date at the time of the trade. During a period of time before the settlement date, such as 48 hours before settlement, the seller specifies or allocates the identity and number of mortgage pools to satisfy the TBA trade. Therefore, a mortgage originator may have until 48 hours before the settlement date to decide whether to use new pools of mortgages or to buy outstanding MBS to cover the trade.

In the TBA, trades may take place some time before the actual settlement of the transaction and underwater positions are subject to very high margins of up to 130% which are administered by the clearer of the TBA market, the Mortgage Backed Security Clearing Corporation (MBSCC) which is a subsidiary of the Fixed-Income Clearing Corporation (FICC). The MBSCC is an organization that provides netting and pool notification services to the mortgage-backed securities market.

Each day the MBSCC gets the closing prices for each forward MBS and determines the mark to market for margining. For example, if a position netted out to show a loss of $1 million, a clearing firm would have to post $1.3 million. Initial/base margins are said to be $250,000 plus an additional 32 basis points on your net position. If the net position is positive, this may be credited to reduce 32 basis point minimum on the net.

TBA markets that provide security and saving from cross-margining for the trading parties are desired. Increases in trading efficiencies, pricing, execution, delivery and settlement of TBA contracts as well as the underlying MBS may increase liquidity and provide security for traders. Therefore, there is a need for systems and methods for administering, settling, and clearing of traded TBA instruments.

BRIEF SUMMARY

By way of introduction, a system, apparatus, and/or method for administering, settling, and clearing TBA instruments provides a centrally cleared, guaranteed, and settled market for exchange listed TBA futures. In an aspect of the invention, mark-to-market gains may be monetized for the TBA instruments. Embodiments may be achieved by, among others, one or more devices, systems, networks, and/or processes for administering, communicating, managing, placing, entering, receiving, matching, clearing, settling, listing and/or confirming orders for TBA Futures.

In an exemplary embodiment, the TBA futures include coupons corresponding to those offered in a TBA market for Class A MBS that are exchange-listed. The coupons may have a par value 100 basis points above and below a current market rate for the corresponding TBA contract. For example, if the Class A mortgage rate is offered at 6.00%, one listed rate for trading will be 5.00% and another will be 7.00%. Additional or less coupons may be added for market conditions. The coupons are traded on an electronic trading system such as the Globex® electronic trading system.

Pricing of the TBA Future is determined in multiples of one-quarter of one thirty-second ($\frac{1}{32}$) per 100 point. ($78.125 rounded up to the nearest cent per contract). Intermonth spreads may have minimum price fluctuations in multiples of one-eighth of one thirty-second point per 100 points ($39.0625 per contract). Par is determined on the basis of 100 points.

An expiring TBA future may be settled with a position in the corresponding TBA contract (i.e., the Class A TBA market). For example, an expiring October 2006 CME 5.5% TBA future may be settled with a position in the October 2006 5.5% Class A TBA market.

Trading may occur on the TBA futures until a predetermined time period before the settlement date, during which trading may no longer occur. In an embodiment, trading may cease on the TBA future on 5th business day before the settlement date for a Class A 30-year MBS as identified in the schedule posted by the Mortgage Backed Securities Clearing Corporation division of the Fixed Income Clearing Corporation.

For example, if FICC has designated a particular day as the delivery day for Class A MBS TBAs, the last trading day for the corresponding TBA Futures would be five days prior to the designated date. After the expiration time, the long and short positions may be netted and counterparties for each open position identified. Each party having an open position in the TBA future may receive delivery instructions. The delivery instructions indicate the party's position, the issuer of the MBS (e.g., FNMA, Freddie Mac), coupon, contract settlement price, and opposite firm or identified counterparty. The parties thus receive notification of their delivery obligations. A delivery confirmation may be sent to the central counterparty for the TBA Futures confirming that the TBA trades conforming to the delivery instructions have been executed.

In an aspect of the invention, a method and system are provided for settling TBA futures contracts. At a central counterparty, open positions in a TBA future market may be determined prior to expiration of a TBA future. Outstanding long and short positions may be cleared and counterparties identified for those positions that will be settled through delivery. The counterparties may be notified of open positions to be settled through delivery.

The foregoing summary is provided only by way of introduction. The features and advantages of the TBA futures and systems for administering, communicating, managing, placing, entering, receiving, matching, clearing, settling, presenting, listing and/or confirming orders for TBA futures may be realized and obtained by the instrumentalities and combinations pointed out in the claims. Nothing in this section should be taken as a limitation on the claims, which define the scope of the invention. Additional features and advantages will be set forth in the description that follows, and in part will be obvious from the description, or may be learned by practice of the present invention.

BRIEF DESCRIPTION OF THE DRAWINGS

Examples of the invention are described with reference to the accompanying drawings, in which components, features and integral parts that correspond to one another each have the same reference number, wherein.

DETAILED DESCRIPTION

The present invention may take physical form in certain parts and steps, embodiments of which will be described in detail in the following description and illustrated in the accompanying drawings that form a part hereof.

In exemplary embodiments, systems, methods and apparatuses for administering, communicating, managing, placing, entering, receiving, matching, clearing, settling, listing and/or confirming orders for TBA futures may be achieved in many different forms, formats, and designs. Embodiments may take the form of one or more devices, systems, distributed networks, data processing systems, and/or processes and should not be construed as limited to the exemplary embodiments set forth herein.

Embodiments also may take the form of electronic hardware, computer software, firmware, including object and/or source code, and/or combinations thereof. Embodiments may be stored on computer-readable media installed on, deployed by, resident on, invoked by and/or used by one or more data processors, controllers, computers, clients, servers, gateways, networks of computers, and/or any combinations thereof. The computers, servers, gateways, may have one or more controllers configured to execute instructions embodied as computer software.

An embodiment may include software stored and executed on an electronic device such as one or more traders terminals, connected to a match server having electronic components configured to carry out instructions according to a computer program stored on a computer-readable storage medium, such as a memory, hard disk, CD-ROM, optical storage device, magnetic storage device and/or combinations thereof to match orders for TBA futures. The electronic device may be a computing device having a programmable controller or processor. For example, the electronic device may be a personal computer, laptop or handheld computer, tablet PC and like computing devices having a user interface. The electronic device may be a dedicated function device such as personal communications device, a portable or desktop telephone, a personal digital assistant ("PDA"), remote control device, personal digital media system and similar electronic devices. The match server may be communicatively coupled with a one or more servers configured to clearing and settlement processes for exchange-listed TBA futures. The clearing house server may be configured to provide central clearing and settlement processes for exchange listed TBA futures. The clearing house server may identify and report margin requirements based on a trader's instantaneous position, including open positions for the trader in any TBA future.

Exemplary Operating Environment

Figure 1:
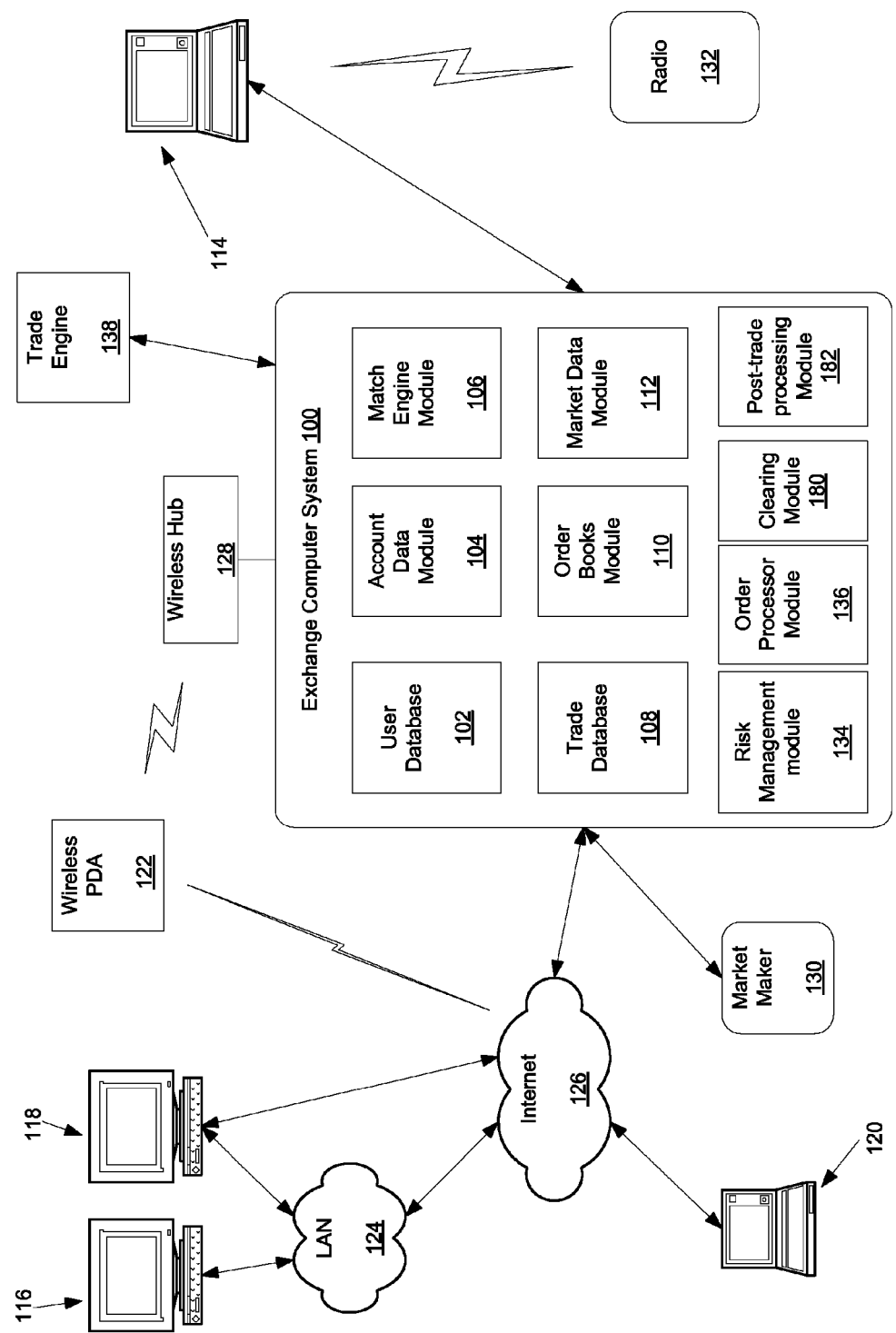
FIG. 1 shows an exemplary system that may be used to implement aspects of a TBA future in accordance with an aspect of the invention.

Aspects of the present invention may be implemented with computer devices and networks configured to allow users to exchange trading information. An exemplary trading network environment for implementing trading systems and methods is shown in FIG. 1.

An exchange computer system 100 receives orders and transmits market data related to orders, trades and related information. Exchange computer system 100 may be implemented with one or more mainframes, servers, gateways, controllers, desktops or other computers.

A user database 102 includes information identifying traders and other users of exchange computer system 100. Data may include user names and passwords. An account data module 104 may process account information that may be used during trades.

A match engine module 106 is included to match bid and offer prices. Match engine module 106 may be implemented with software that executes one or more algorithms for matching bids and offers.

A trade database 108 may be included to store information identifying trades and descriptions of trades. In particular, a trade database may store information identifying or associated with the time that a trade took place and the contract price.

An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

A clearing module 180 may be included to clear outstanding long and short positions for MBS TBA futures on contract settlement day or any other trading day. Furthermore, a post-trade processing module 182 may also be included to generate reports and enumerate details of the forward TBA trade which may fulfill delivery obligations.

The trading network environment shown in FIG. 1 includes computer devices 114, 116, 118, 120 and 122. The computer devices 114, 116, 118, 120 and 122 may include one or more central processors, or controllers, that control the overall operation of the computer. The computer devices 114, 116, 118, 120 and 122 may include one or more system buses that connect the central processor to one or more components, such as a network card or modem. The computer devices 114, 116, 118, 120 and 122 may also include interface units and drives for reading and writing data or files. Depending on the type of computer device, a user can interact with the computer with a keyboard, pointing device, microphone, pen device or other input device.

Computer device 114 is shown communicatively connected to exchange computer system 100. Exchange computer system 100 and computer device 114 may be connected via a T1 line, a common local area network (LAN) a wireless communication device or any other mechanism for communicatively connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a local area network ("LAN") 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for communicatively connecting a computer device to the Internet.

One or more market makers 130 may maintain a market by providing substantially constant bid and offer prices for a financial instrument, such as a derivative or security, to exchange computer system 100. Exchange computer system 100 may also exchange information with other trade engines, such as trade engine 138. Numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Additional servers, computers, handheld devices, personal digital assistants, telephones and other devices may also be connected to exchange computer system 100. Moreover, the topology shown in FIG. 1 is merely an example and that the components shown in FIG. 1 may be connected by numerous alternative topologies.

Exemplary Embodiments

Figure 2:
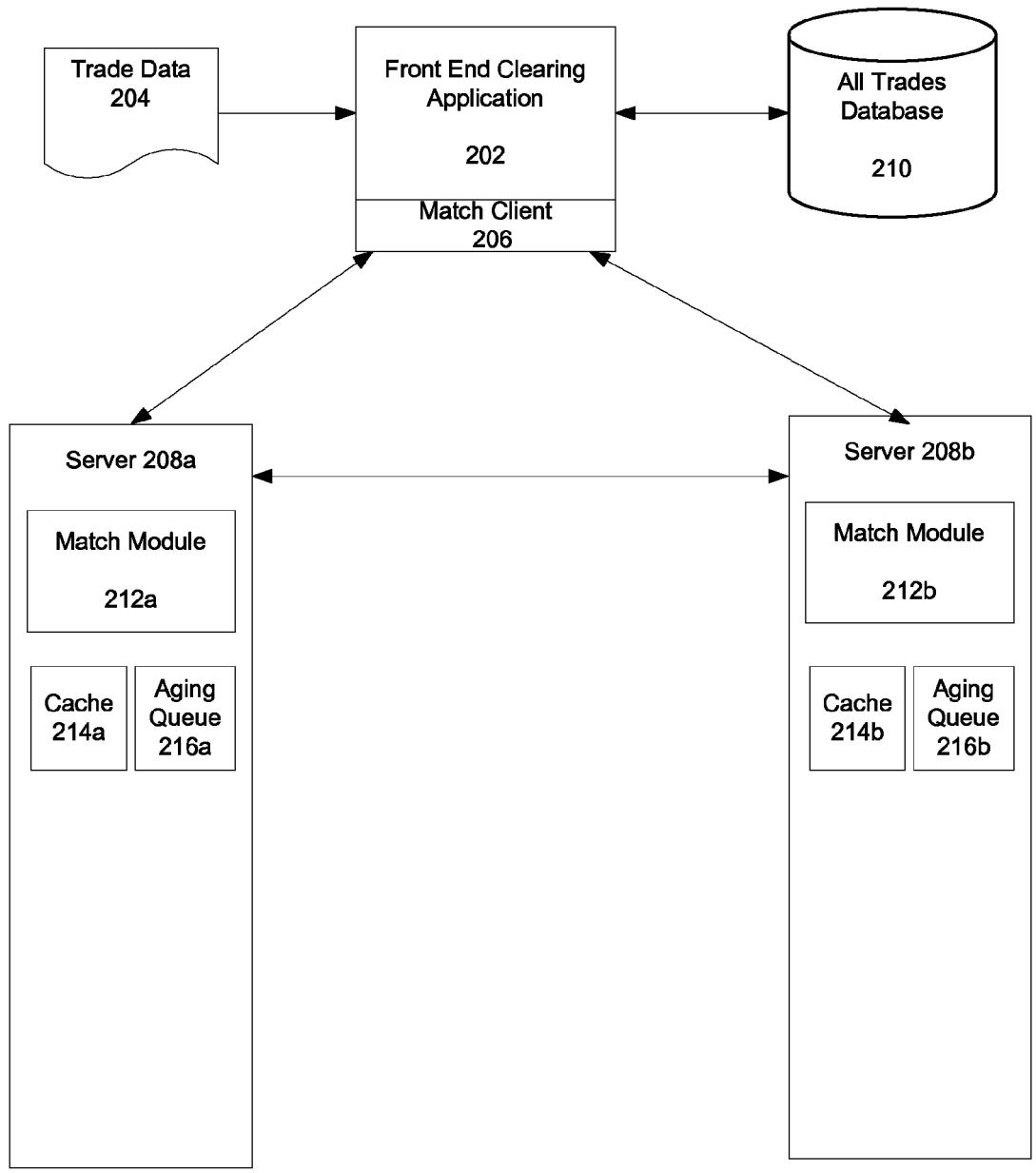
FIG. 2 shows an exemplary system that may be used to match orders for a TBA future in accordance with an aspect of the invention.

FIG. 2 shows an exemplary system that may be used to match orders and/or trades for TBA futures. The coupons corresponding to the TBA futures may be traded on an electronic trading system such as the Globex® electronic trading system. At least one benefit of an exchange traded derivative, as opposed to an OTC type, is that the derivative is cleared and guaranteed by a central counterparty clearing firm. This may provide capital efficiencies and minimized risk for traders of the exchange traded derivative. In addition, margin requirements may be lowered for entities that utilize cross-margining across different derivative or interest rate products.

In FIG. 2, a front end clearing application 202 receives trade data 204. Trade data 204 may include information that identifies an order for a futures contract. In an aspect of the invention, the futures contract may be a TBA futures contract that includes information such as coupon rate corresponding to those offered in a TBA market for a Class A MBS. The coupons may have a par value 100 basis points above and below a current market rate for the corresponding TBA contract. For example, if the Class A mortgage rate is offered at 6.00%, one listed rate for trading will be 5.00% and another will be 7.00%. Additional or less coupons may be added for market conditions. As those skilled in the art will realize, additional order type information pertaining to different type orders such as limit orders, stop orders, market orders, and FAK orders may also be provided.

A match client 206 may contain application program interfaces and/or other software modules that allow front end clearing application 202 to communicate with a plurality of match servers 208a and 208b. A variety of different match clients may be used to allow different front end clearing applications to communicate with match servers. For example, a first front end clearing application may use a first match client to communicate with a set of match servers and a second front end clearing application may use a second match client to communicate with the same set of match servers. Front end clearing application 202 is also coupled to an all trades database 210. All trades database 210 contains a master record of all trades that have taken place.

The embodiment shown in FIG. 2 includes two match servers 208a and 208b. Servers 208a and 208b may be in the same location or may be geographically distributed. Two servers are shown for illustration purposes only and with the understanding that aspects of the invention may use more or fewer servers. Match servers 208a and 208b may each be connected to one another, connected through a common hub or connected in another manner that allows each match server to communicate with the remaining match servers. Servers 208a and 208b contain modules for matching orders, such as futures orders executed at an exchange. Server 208a includes a match module 212a that may be implemented with a software application that matches unmatched trades. Match module 212a may include or be linked to a set of rules for matching orders. The rules for matching orders may identify specific match criteria used for matching specific orders. As described in detail below, a match module may use several different match criteria and the match criteria selected may be a function of the length of time that order data has remained unmatched.

Server 208b may include match modules 212b which may be similar to match module 212a. In one embodiment of the invention, match modules may be used to match specific types of orders or trades that take place in specific locations. For example, match module 212a may be configured to match orders that were executed at one exchange and match module 212b may be used to match orders that were executed at another exchange.

Trade data is initially received from front end clearing application 202 and stored in caches 214a and 214b. In one embodiment of the invention, each cache contains all trade data. In another embodiment of the invention, trade data is distributed among caches 214a and 214b.

In one embodiment of the invention, match modules 212a and 212b and/or caches 214a and 214b communicate using the Java Messaging Service standard publish and subscribe application program interface (API). The type of information that may be exchanged includes information to add, update and remove trade and/or order data from caches 214a and 214b. In one implementation, only information identifying changes in the state of caches 214a and 214b is exchanged, as opposed to information identifying the entire state of a cache.

Servers 208a and 208b may also include aging queues 216a and 216b. Each aging queue may contain trade data that has not been matched. Each aging queue may contain a unique subset of unmatched trade data so that the workload is distributed across servers.

Figure 3:
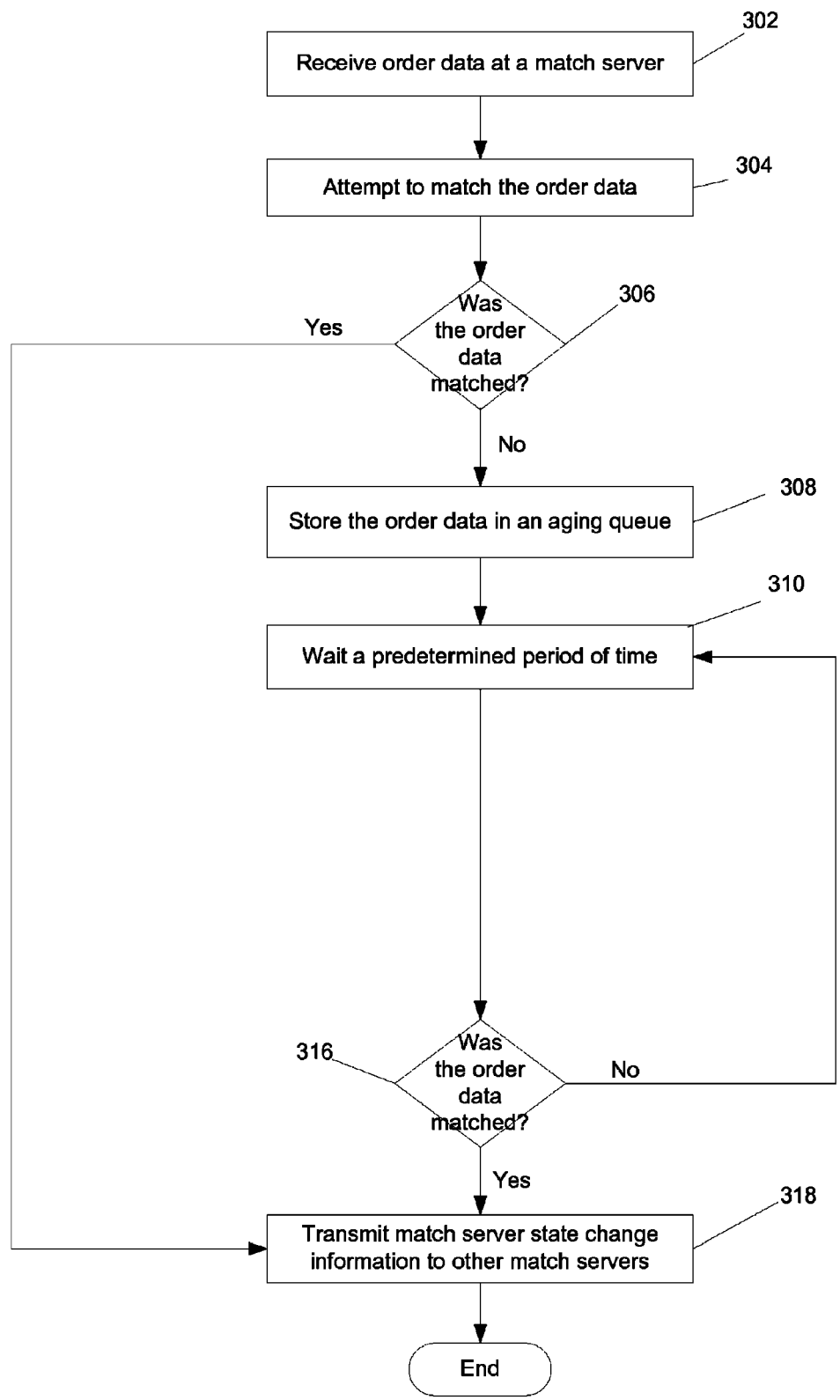
FIG. 3 shows a exemplary method that may be used to match orders for TBA futures in accordance with an aspect of the invention.

FIG. 3 illustrates a method of matching orders in accordance with an embodiment of the invention. In step 302 order data is received at a match server. Order data may include information that identifies a particular class, price and quantity for a MBS TBA future. In step 304, an attempt may be made to match the received order data with other existing orders. Step 304 may be performed at a match module, such as match module 212a and may include attempting to match the order data to existing but opposite orders.

Next, in step 306 it is determined whether the order data was matched. When the order data is matched, the process proceeds to step 318, which is described below. When the trade data has not been matched, in step 308 the order data is stored in an aging queue. The order data is stored in the aging queue for a predetermined period of time in step 310.

In step 316, it is again determined whether the order data was matched. When the order data has been matched, the match server may transmit state change information to other match servers in step 318. Step 318 allows other match servers to stop any attempts to match the order data that has been matched.

In an aspect of the invention, MBS TBA future contracts may consist of a series of monthly expirations based upon Ginnie Mae and GSE (Fannie Mae and Freddie Mac) Mortgage Backed Securities which already trade in the TBA over-the-counter market. Trading may occur on MBS TBA future contracts until a predetermined time period before the settlement date, during which trading may no longer occur. For example, trading may cease on TBA futures on fifth business day before the settlement date for a Class A 30-year MBS as identified in the schedule posted by the Mortgage Backed Securities Clearing Corporation division of the Fixed Income Clearing Corporation.

In an alternative embodiment, trading may cease on MBS TBA future contracts one week or seven days before the monthly settlement determined by the Bond Market association as this is the traditional settlement day for options on mortgage-backed securities. For example, if July 13$^{th}$ were the MBS TBA settlement date then trading may cease on July 6$^{th}$.

In an aspect of the invention, MBS TBA futures contracts may be cleared and settled through a central counterparty clearing firm. The central counterparty clearing firm may utilize clearing module 180 and post-trade processing module 182. The MBS TBA futures contracts may be guaranteed by the central counterparty clearing firm. The central counterparty clearing firm may at any time upon notification of liquidation of MBS TBA future contracts clear any outstanding long and short positions. The MBS TBA future contracts may be mark-to-market for clearing purposes.

If the central counterparty clearing firm is notified that positions will be settled with a delivery of the MBS, then after the expiration time, the long and short positions may be netted and clearing firms for each open position identified. Each party having an open position in the MBS TBA future may receive delivery instructions. The delivery instructions may indicate the party's position, the issuer of the MBS (e.g., FNMA, Freddie Mac), coupon, contract settlement price, and an identified counterparty clearing firm. The parties thus receive notification of their delivery obligations. A delivery confirmation may be sent to the central counterparty clearing firm confirming that the TBA trades conforming to the delivery instructions have been executed.

In an aspect of the invention, the central counterparty clearing firm may require that clearing firms that want to trade MBS TBA futures have in place a relationship with an MBSCC member to effect delivery. The central counterparty clearing firm may generate a list of clearing firms which are also members of the MBSCC. After MBS TBA future contract launch, the central counterparty clearing firm may generate an exceptions report indicating clearing firms holding open interests which are not MBSCC members.

In an aspect of the invention, a determinable number of days prior to contract expiration/delivery, clearing firms appearing on the exceptions report are informed that they must either liquidate their positions or provide the central counterparty clearing firm with a clearing firm that is a member of the MBSCC. For example, clearing firm X may be long 100 TBA futures two days prior to delivery and appears on the central counterparty clearing exceptions list. Firm X will have to either liquidate their position or inform the central counterparty clearing firm which MBSCC clearing firm has been designated to book the 100 lot TBA buy order on its behalf. In an embodiment, firm X may inform the central counterparty clearing firm that firm Z has been chosen as their clearing firm. On contract settlement day, the central counterparty clearing firm matches and clears outstanding long and short positions. The central counterparty clearing firm may generate a delivery report on behalf of firm X enumerating the details of the forward TBA trade that will fulfill their delivery obligation, e.g. counterparty, trade price, size, coupon, etc. . . . . The central counterparty clearing firm may notify firm Y that firm Y is 100 futures short and furthermore that their counterparty is MBSCC member firm Z who books the order on behalf of firm X.

In an aspect of the invention, the central counterparty clearing firm may establish a subset of clearing firms which may be used to book TBA trades based on open TBA future positions. In an embodiment, the subset of clearing firms may include two firms so that all market participants understand that in order to fulfill their contract delivery obligations; they will have to have a TBA trading relationship with one of the central counterparty clearing designated firms.

Figure 4:
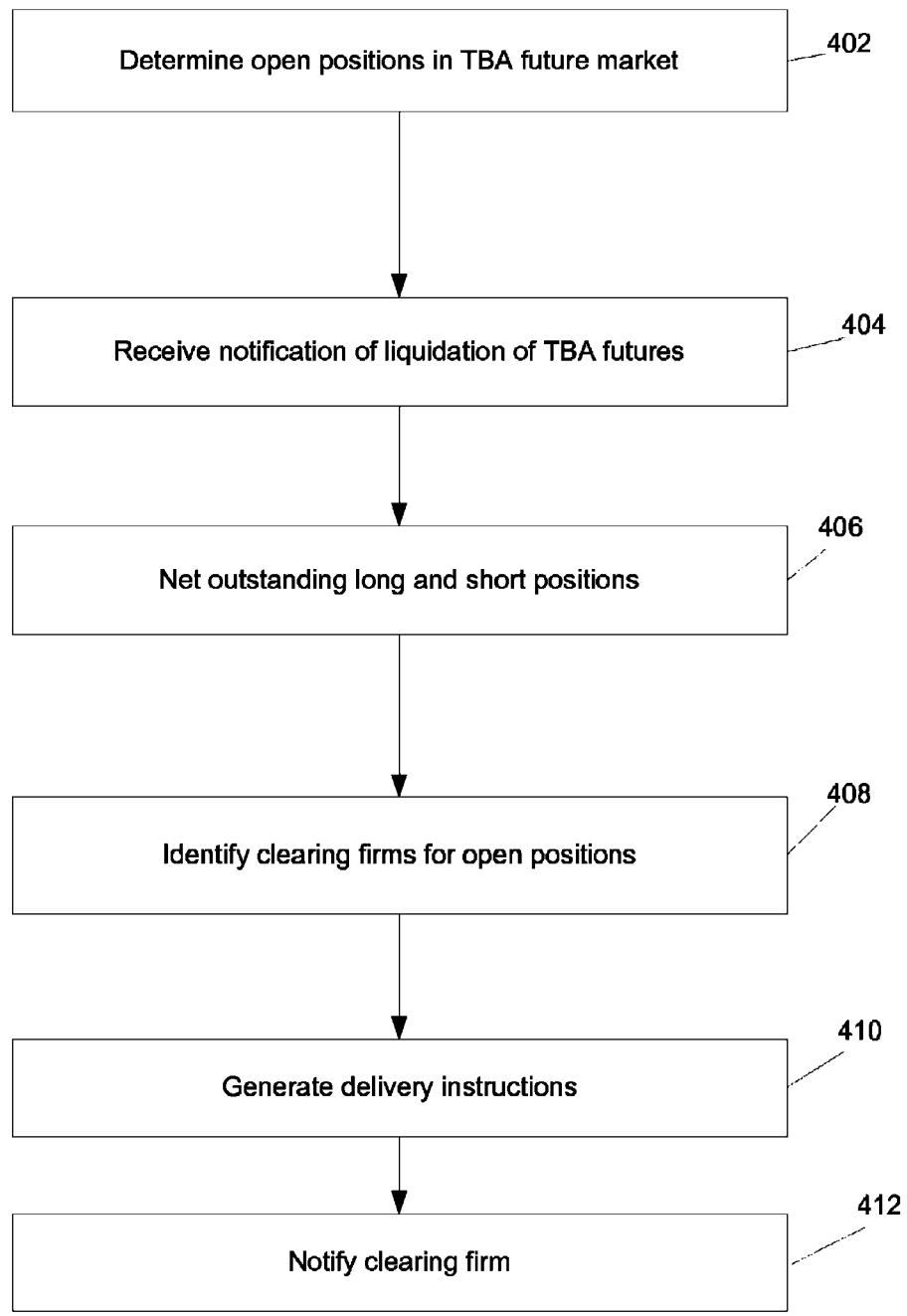
FIG. 4 shows an exemplary method for clearing and settling open positions for TBA futures in accordance with an aspect of the invention.

FIG. 4 shows an exemplary method for clearing and settling open positions for TBA futures according to one aspect of the invention. In step 402, open positions may be determined in a TBA future market prior to expiration of a TBA future. In step 404, notification of liquidation of TBA future contracts may be received at a central counterparty. Next, in step 406 netting of outstanding long and short positions may be executed at the central counterparty. The netting may comprise mark-to-market the outstanding long and short positions for clearing purposes.

In step 408, a clearing firm for each open position to be settled by delivery may be determined. The clearing firm may be chosen from a list generated and maintained by the central counterparty clearing firm. The chosen clearing firm may be a member of the MBSCC. Next, in step 410 the central counterparty may generate delivery instructions. The delivery instructions may comprise information such as position information, identity of an issuer of an MBS, coupon rate, contract settlement price, and an identified counterparty. Finally in step 412, the clearing firm may be notified of the delivery instructions.

Various embodiments have been described and illustrated. However, the description and illustrations are by way of example only. Many more embodiments and implementations are possible within the scope of this invention and will be apparent to those of ordinary skill in the art.

It is intended in the appended claims to cover all such changes and modifications which fall within the true spirit and scope of the invention. Therefore, the invention is not limited to the specific details, representative embodiments, and illustrated examples in this description. Accordingly, the invention is not to be restricted except in light as necessitated by the accompanying claims and their equivalents.

We claim:

1. A computer-implemented method for settling to-be-announced (TBA) futures contracts comprising:
    determining all open positions in a TBA future market prior to expiration of a TBA future at a central counterparty computer system;
    processing a notification of liquidation of the TBA futures contracts;
    netting outstanding long and short positions in response to the notification and prior to the expiration of the TBA future;
    identifying a counterparty for each open position; and
    confirming open positions to each identified counterparty;
    generating delivery instructions for the open positions;
    wherein the delivery instructions comprise position information, identity of an issuser of a mortgage backed security (MBS), coupon rate, contract settlement price, and an identified counterparty.

2. The method of settling TBA futures contracts of claim 1, wherein the TBA futures comprise mortgage security (MBS) TBA futures.

3. The method of settling TBA futures contracts of claim 1, wherein the netting of outstanding long and short positions includes marking-to-market of the TBA futures contracts.

4. A computer-implemented method for settling to-be-announced (TBA) futures contracts through a central counterparty, the method comprising:
    determining at the central counterparty open positions in a TBA future;
    processing a notification of liquidation of TBA future contracts;
    netting, by a central counterparty computer system, outstanding long and short positions in response to the notification and prior to the expiration of the TBA future;
    determining a clearing firm for each open position to be settled by delivery;
    generating delivery instructions; and
    wherein the delivery instructions comprise position information, identity of an issuer of a mortgage backed security (MBS), coupon rate, contract settlement price, and an identified counterparty;
    notifying the clearing firm of the delivery instructions.

5. The method of settling TBA futures of claim 4, further comprising confirming the open positions to each determined counterparty.

6. The method of settling TBA futures of claim 4, wherein the step of netting comprises marking-to-market the outstanding long and short positions.

7. The method of settling TBA futures of claim 4, wherein the clearing firm is a member of a mortgage backed security clearing corporation (MBSCC).

8. The method of settling TBA futures of claim 4, wherein the delivery instructions include details of a forward TBA trade to fulfill delivery obligations.

9. The method of settling TBA futures of claim 4, further comprising confirming the open positions to each determined counterparty.

10. The method of settling TBA futures of claim 4, wherein the clearing firm comprises a central counterparty clearing firm.

11. The method of settling TBA future of claim 4, wherein the clearing firm has a relationship with a mortgage backed security clearing corporation (MSBCC) member firm.

12. The method of settling TBA future of claim 4, wherein the clearing firm is approved by the central counter party.

13. The method of settling TBA future of claim 4, wherein the central counterparty designates at least two clearing firms through which deliveries are made.

14. The method of settling TBA future of claim 4, wherein the determining of the clearing firm further comprises:
    identifying that at least one of the open positions is associated with an unapporved clearing firm;
    requesting that the unapproved clearing firm liquidate the at least one of the open positions or use the clearing firm; and
    receiving a selection of the clearing firm.

* * * * *